United States Patent
Fanghaenel

(10) Patent No.: US 12,505,096 B2
(45) Date of Patent: Dec. 23, 2025

(54) TRANSLATION OF TENANT IDENTIFIERS

(71) Applicant: Salesforce, Inc., San Francisco, CA (US)

(72) Inventor: Thomas Fanghaenel, Oakland, CA (US)

(73) Assignee: Salesforce, Inc., San Francisco, CA (US)

( * ) Notice: Subject to any disclaimer, the term of this patent is extended or adjusted under 35 U.S.C. 154(b) by 84 days.

(21) Appl. No.: 18/141,565

(22) Filed: May 1, 2023

(65) Prior Publication Data

US 2023/0267116 A1    Aug. 24, 2023

Related U.S. Application Data

(62) Division of application No. 16/139,889, filed on Sep. 24, 2018, now Pat. No. 11,663,207.

(51) Int. Cl.
*G06F 16/30* (2019.01)
*G06F 16/22* (2019.01)
*G06F 16/2452* (2019.01)

(52) U.S. Cl.
CPC ........ *G06F 16/2452* (2019.01); *G06F 16/221* (2019.01); *G06F 16/2237* (2019.01); *G06F 16/2291* (2019.01)

(58) Field of Classification Search
None
See application file for complete search history.

(56) References Cited

U.S. PATENT DOCUMENTS

| | | | |
|---|---|---|---|
| 6,360,213 B1 | 3/2002 | Wagstaff | |
| 6,732,124 B1 | 5/2004 | Koseki | |
| 8,938,428 B1 * | 1/2015 | Ozekinci | G06F 11/1458 707/648 |
| 9,317,706 B2 * | 4/2016 | Kaushik | G06F 16/951 |
| 9,779,269 B1 * | 10/2017 | Perlman | G06F 16/2291 |
| 11,263,193 B2 * | 3/2022 | Leingang | G06F 16/2282 |
| 12,061,606 B1 * | 8/2024 | Kadado | G06F 16/2358 |
| 2002/0087500 A1 | 7/2002 | Berkowitz | |
| 2002/0095421 A1 * | 7/2002 | Koskas | G06F 16/284 |
| 2004/0148420 A1 * | 7/2004 | Hinshaw | G06F 16/273 707/E17.032 |

(Continued)

OTHER PUBLICATIONS

Wu, Ming-Chuan, and Alejandro P. Buchmann. "Encoded bitmap indexing for data warehouses." Proceedings 14th International Conference on Data Engineering. IEEE, 1998. (Year: 1998).*

(Continued)

*Primary Examiner* — Polina G Peach
(74) *Attorney, Agent, or Firm* — Butzel Long

(57) ABSTRACT

Systems, devices, and techniques are disclosed for translation of tenant identifiers. A record may be received. A value of a tenant identifier for the record may be determined from a key for the record or a scan descriptor. The value of the tenant identifier in the key for the record may be replaced with a new value for the tenant identifier. A bitmap stored in a record header of the record may be used to identify columns of the record that stored an encoded value of the tenant identifier. An encoded new value of the tenant identifier may be stored in columns identified by the bitmap stored in the record header that include an attribute indicating that tenant identifier translation is enabled.

18 Claims, 14 Drawing Sheets

(56) References Cited

U.S. PATENT DOCUMENTS

| | | | |
|---|---|---|---|
| 2005/0223022 A1 | 10/2005 | Weissman | |
| 2007/0050381 A1 | 3/2007 | Hu | |
| 2007/0121632 A1 | 5/2007 | Zabarski | |
| 2007/0233718 A1 | 10/2007 | Hays | |
| 2008/0162491 A1 | 7/2008 | Becker | |
| 2009/0115576 A1* | 5/2009 | Schuessler | G06F 16/2237 707/999.1 |
| 2010/0257351 A1* | 10/2010 | O'Connor | G06F 21/606 713/150 |
| 2011/0214062 A1* | 9/2011 | Doshi | G06F 16/955 715/738 |
| 2012/0030172 A1 | 2/2012 | Pareek | |
| 2013/0110828 A1* | 5/2013 | Meyerzon | G06F 16/9538 707/769 |
| 2013/0144908 A1 | 6/2013 | Geroulo | |
| 2013/0325808 A1 | 12/2013 | Bachar | |
| 2014/0250090 A1 | 9/2014 | Faerber | |
| 2015/0052150 A1* | 2/2015 | Sharique | G06F 16/2255 707/747 |
| 2015/0143064 A1 | 5/2015 | Bhargava | |
| 2015/0324480 A1 | 11/2015 | Schreter | |
| 2016/0055197 A1* | 2/2016 | Caro | G06F 16/219 707/695 |
| 2016/0085832 A1 | 3/2016 | Lam | |
| 2016/0283538 A1* | 9/2016 | Barber | G06F 16/2272 |
| 2017/0060569 A1* | 3/2017 | Piccinini | G06F 8/656 |
| 2017/0116242 A1* | 4/2017 | Chavan | G06F 12/0875 |
| 2017/0116280 A1 | 4/2017 | Shergill, Jr. | |
| 2017/0323119 A1 | 11/2017 | Harp | |
| 2018/0011893 A1* | 1/2018 | Kimura | G06F 16/283 |
| 2018/0081767 A1 | 3/2018 | He | |
| 2018/0089261 A1 | 3/2018 | Li | |
| 2018/0129585 A1 | 5/2018 | Martin | |
| 2018/0196839 A1* | 7/2018 | Clapham | H04L 43/04 |
| 2018/0196947 A1* | 7/2018 | Davis | G06F 21/602 |
| 2018/0307857 A1* | 10/2018 | Beecham | G06F 16/9024 |
| 2018/0373741 A1* | 12/2018 | Martin | G06F 16/256 |
| 2019/0362026 A1 | 11/2019 | Nowakiewicz | |
| 2019/0377723 A1* | 12/2019 | Caro | G06F 16/2365 |
| 2020/0159708 A1 | 5/2020 | Bi | |

OTHER PUBLICATIONS

European Patent Office Communication pursuant to Article 94(3) EPC issued in App. No. EP19787503.2, dated Aug. 1, 2022, 6 pages.
Indian Office Action issued in App. No. IN202147003898, dated Nov. 30, 2022, 7 pages.
International Search Report and Written Opinion for Application No. PCT/US2019/052455, date of mailing Dec. 13, 2019, 12 pages.
International Preliminary Report on Patentability for App. No. PCT/US2019/052455, dated Apr. 1, 2021, 8 pages.
Australian Examination Report No. 1 issued in App. No. AU2019349429, dated Dec. 4, 2023, 4 pages.
Chinese Office Action issued in App. No. CN201980051015, dated Nov. 1, 2023, 8 pages.

* cited by examiner

TRANSLATION OF TENANT IDENTIFIERS

BACKGROUND

Records in a multi-tenant database may include tenant identifiers that indicate the tenants that own the records. In some situations, records belonging to a tenant may need to have their included tenant identifier replaced with a new tenant identifier. Translating a tenant identifier already stored in a record to a new tenant identifier, for a group of records, may be computationally intensive.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
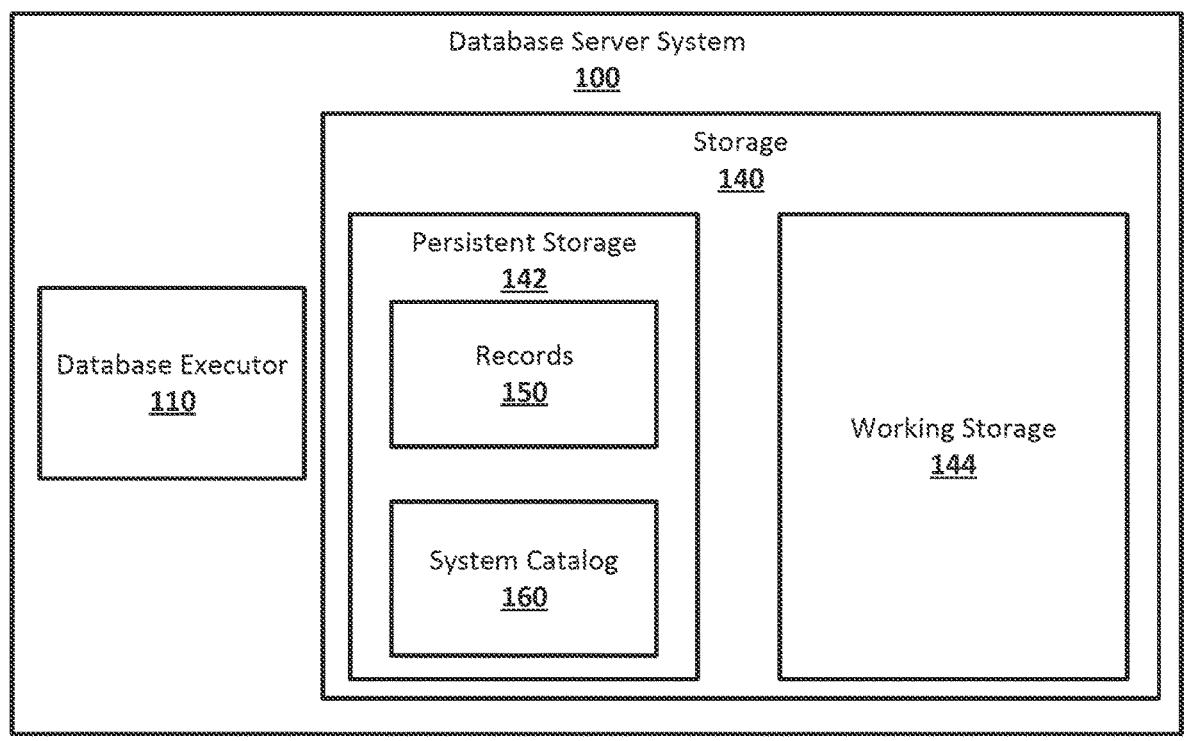
FIG. 1 shows an example system for translation of tenant identifiers according to an implementation of the disclosed subject matter.

Techniques disclosed herein enable translation of tenant identifiers, which may allow for more efficient translation of tenant identifiers used to identify the owner of database records. A record that includes a tenant identifier column which stores the value of the tenant identifier may have the value of tenant identifier removed from the tenant identifier column. If the value of the tenant identifier is stored in columns of the record other than the tenant identifier column, for example, in encoded form, a bitmap may be created which may indicate which columns of the record store the value of the tenant identifier. The value of the tenant identifier may then be removed from the columns of the record which store the value of the tenant identifier. The value of the tenant identifier and the bitmap may be stored in the record header of the record. The record may also include a key which may identify the record in a multi-tenant database. The key for a record may include the value of the tenant identifier. The value for the tenant identifier may be retrieved from the key for the record, or from a scan descriptor for a query that identified the record, when a record which has had the value its tenant identifier removed from its columns is unpacked. When tenant identifier translation is needed for the record, the value of the tenant identifier in the key for the record may be replaced with a new value, for a new tenant identifier. The bitmap in the record header may be used to identify the columns of the record which had previously stored the value of the tenant identifier. The metadata for the identified columns may be checked to determine if the columns have tenant identifier translation enabled. The new value of the tenant identifier may be used as the value of those columns identified by the bitmap whose metadata indicate that tenant identifier translation is enabled. Columns identified by the bitmap whose metadata indicate that they do not need tenant identifier translation may have the value of the tenant identifier taken from the record header of the record used as their column value.

A tenant identifier may be used to identify the owner of records stored in a database system. The value of a tenant identifier assigned to a tenant may be used as part of the key for all of the records belonging to the tenant that may be stored in the database system. The value of a tenant identifier may be represented as, for example, an alphanumeric string.

If the database system is a multi-tenant database system, a unique tenant identifier may be assigned to each of its tenants. Multi-tenancy may allow various tenants, which may be, for example, users, groups of users, or organizations, to access their own records in the database system through software tools or instances on the database system that may be shared among the various tenants. The records for each tenant may be part of a record set for that tenant. The database may be, for example, a relational database, hierarchical database, or any other suitable database type. All records stored in the database system may be stored in any suitable structure, including, for example, a Log-Structured Merge (LSM) tree.

A record stored in the database system may include a key. The key may be an identifier for the record, for example, a primary key, and may be in any suitable form, such as, for example, an alphanumeric sequence. Portions of the key may provide information about the record. For example, a portion of the key be the value of the tenant identifier for the tenant to whom the record belongs. Other portions of the key may identify, for example, a table number and identification of a row, for example, when the value of record is the contents of a row.

A record may include values. The values in a record may be, for example, the contents of columns in a row of a table of a relational database, stored as a tuple with one value per column. The values stored as a tuple may be encoded, for example, using a binary encoding. Some records may store the value of the tenant identifier for the tenant that owns the record encoded in the tuple as an encoded value of the tenant identifier. The encoded value of the tenant identifier may be stored in, for example, a tenant identifier column of the record. The encoded value of the tenant identifier may also be stored in other columns of the record which may not be tenant identifier columns.

In some situations, the tenant identifier of a record may need to be translated. Tenant identifier translation may replace the value of a tenant identifier in a record with a new value, of a new tenant identifier. For example, when records in a tenant's record set are copied to create a clone of all or a portion of the tenant's record set, for example, for sandboxing, tenant identifier translation may be used to assign a new tenant identifier to the copied records. This may allow records in a sandbox database to be used by the tenant independently of the records in the tenant's record set which was cloned.

To allow for more efficient tenant identifier translation, the records stored in the database system may be modified. A record may have the encoded value of the tenant identifier removed from its tenant identifier column. The attribute number of the tenant identifier column may be stored in the record header of the record. A record type indicator may be set in the record header. The record type indicator may be a bit that may be set to 1, or true, to indicate that the record has had the encoded value of the tenant identifier removed from its tenant identifier column. A record which also stores the encoded value of the tenant identifier in columns other than the tenant identifier column may have a bitmap generated. The bitmap generated for a record may indicate which columns of the record store the encoded value of the tenant identifier. The encoded value of the tenant identifier may then be removed from the columns of the record which stored the encoded value of the tenant identifier. The encoded value of the tenant identifier and the bitmap may be stored in a record header of the record. A bitmap indicator may be set in the record header to indicate the presence of both the bitmap and the encoded value of the tenant identifier. The bitmap indicator may be a bit, which may be set to 1, or true, to indicate that the record header stores the bitmap and the encoded value of the tenant identifier. This may result in a record which does not store the value of the tenant identifier, or an encoded value of the tenant identifier, in its columns.

The bitmap may be in any suitable format. For example, the bitmap for a record may be stored as a binary string with a number of digits equal to, or one less than, the number of columns in the record. Each bit of the binary string may correspond to a column of the record, so that there may be a bit in the binary string for every column of the record, or for every column that is not the tenant identifier column. When the bitmap is generated, the bit corresponding to a column may be set to 1 when that column stores an encoded value of the tenant identifier, and to 0 when that column does not store an encoded value of the tenant identifier.

A record may be modified to remove the value of tenant identifier from the columns of the record when, for example, the record is packed to its in-storage representation, which may be before being written to persistent storage of the database system.

When a record which has the encoded value of the tenant identifier removed from its columns is read from persistent storage into the working memory of the database system the value for the tenant identifier to use with the tenant identifier column of the record may be retrieved from the key for the record, or from a scan descriptor for a query that identified the record. For example, the key for the record may be an alphanumeric string that may include, as a portion, the value of the tenant identifier for the tenant that owns the record. The value for the tenant identifier may be retrieved from the key for the record. A scan descriptor for a query submitted to the database system may also include the value of the tenant identifier for the tenant that owns the records in the database against which the query will be run to find responsive records. The scan descriptor may receive the value of the tenant identifier from, for example, an executor running on the database system. The value of the tenant identifier may be retrieved from the scan descriptor of the query to which the record was responsive. The value of the tenant identifier, as retrieved from the key or the scan descriptor, may be encoded and the resultant encoded value of the tenant identifier may be used to fill in the tenant identifier column of the record while the record is in the working memory of the database system. The tenant identifier column of the record may be identified by the attribute number of the tenant identifier column stored in the record header. If the record header of the record stores a bitmap, the encoded value of the tenant identifier may be used while the record is in working memory to fill in the columns identified by the bitmap as having previously stored the encoded value of the tenant identifier. When the record is packed in working memory before being transferred to persistent storage, the encoded value of the tenant identifier may again be removed from the tenant identifier column and any other columns in which it is stored before the record is packed.

When tenant identifier translation is needed for the record, the value of the tenant identifier in the key for the record may be replaced with a new value for a new tenant identifier. For example, the key for the record may be rewritten by the executor of the database system, replacing the value of the tenant identifier with the new value for the tenant identifier. This may change the tenant identified as the owner of a record by the database system, and the tenant record set to which the record belongs. For example, when a tenant's record set is cloned for sandboxing, the records copied from the tenant's record set to form the sandbox database may need new tenant identifiers to allow the records in the sandbox database to be worked with separately from the records in the tenant's record set. A new value for a tenant identifier may be used to replace the value for the tenant identifier in the keys for the records in the sandbox database. When a record that has had its key rewritten with a new value for a tenant identifier is read into working memory, the database system may encode the new value for the tenant identifier and use the encoded new value of the tenant identifier to fill in the tenant identifier column of the record. The tenant identifier column of the record may be identified by the attribute number for the table identifier column stored in the record header of the record.

The executor of the database system may fill in columns of the record which had previously stored the encoded value of tenant identifier when the record is copied to working memory of the database system. The presence of such columns in a record may be indicated by the value of the bitmap indicator bit in the record header, which may be set, for example, to 1, to indicate the presence of both the bitmap and the encoded value of the tenant identifier in the record header. The bitmap stored in the record header of the record may be used to identify the columns that had stored the encoded value of the tenant identifier. For columns of the record that the bitmap indicates had previously stored the encoded value of the tenant identifier, metadata for the column may be accessed to determine if tenant identifier translation is enabled for that type of column.

The metadata for a column may be part of a system catalog for the database system. For example, the type of a column may be stored in the system catalog. The system catalog may include metadata for all types of columns which may include an indication, for example, in the form of a Boolean variable, of whether tenant identifier translation is enabled for that type of column. Tenant identifier translation may not be enabled for any type of column that is part of a secondary index in the database system.

If the metadata indicates that tenant identifier translation is enabled for the column type of the column identified by the bitmap of the record, the executor of the database system may retrieve the new value of the tenant identifier from the key or the scan descriptor to be encoded and filled in as the value of the column. If the metadata indicates that tenant identifier translation is not enabled for the column type of the column identified by the bitmap, the executor of the database system may retrieve the encoded value of the tenant identifier from the record header to use as the value of the column. The encoded value of the tenant identifier from the record header may be an encoding of the original value of the tenant identifier even when the value of the tenant identifier in the key has been replaced with the new value of the new tenant identifier. This may allow the use of the proper value of the tenant identifier, either the original value or the new value, in the columns of a record that had previously stored the encoding of the original value of the tenant identifier and no longer store any value of the tenant identifier in the copy of the record in persistent storage.

For columns of a record identified by the bitmap in the record header that are of a column type for which tenant identifier translation is not enabled, for example due to the column being part of a secondary index, a database application may determine whether to apply tenant identifier translation. The database application may be an application used to interact with the database system. For example, a computing device running the database application may be used by a tenant to access its database in the database system.

In some implementations, there may a be regular database index that may be used to locate records that may need tenant identifier translation, or the number of records that may need tenant identifier translation may be small, for example, as they may be the records of a small table of the database. The regular database index may be used when records include columns that translation may not be enabled for, such as columns that are used in secondary indexes. An update command may be implemented by the database system that may update records that may need tenant identifier translation before a sandbox database with the records, which may be cloned from the tenant's original records, is made available to users, for example, to access through the database application. The update command may perform tenant identifier translation by walking all of the columns of the records indexed by the regular database index, or all of the records which may need tenant identifier translation and replacing any value in column that matches the encoded value of the tenant identifier with an encoded new value of the tenant identifier.

FIG. 1 shows an example system for translation of tenant identifiers according to an implementation of the disclosed subject matter. A database system 100 may include any suitable computing devices, such as, for example, a computer 20 as described in FIG. 9 or component thereof, for translation of tenant identifiers. The database system 100 may be implemented on a laptop, a desktop, an individual server, a server cluster, a server farm, or a distributed server system, or can be implemented as a virtual computing device or system, or any suitable combination of physical and virtual systems. The database system 100 can be part of a computing system and network infrastructure or can be otherwise connected to the computing system and network infrastructure, including a larger server network which can include other server systems. The database system 100 may include, for example, any number of server systems which may be in communication with each other and may communicate in any suitable manner. For example, the server systems of the database system 100 may be connected through any suitable network, which may be any suitable combination of LANs and WANs, including any combination of private networks and the Internet. The database system 100 may include a database executor 110 and a storage 140. The storage 140 may include persistent storage 142 and working storage 144. Records 150 and system catalog 160 may be stored in the persistent storage 142.

The database executor 110 may be any suitable combination of hardware and software of the database system 100 for interacting with and managing databases stored on the database system 100. The database system 100 may be, for example, a multi-tenant database system which may store databases for multiple tenants. The records 150 may include records for the databases for the multiple tenants of the database system 100. The database executor 110 may be able to retrieve records from the records 150 for a tenant based on a received query with a scan descriptor and may be able to manipulate records from the records 150. For example, the database executor 110 may be able to copy records from the persistent storage 142 to the working storage 150, update records with new values, merge records from the working storage 150 back to the persistent storage 142 and create new copies of records in the records 150, for example, when cloning a tenant's record set during the creation of a sandbox database.

The persistent storage 142 may be any suitable combination of hardware and software for the persistent storage of data, such as the records 150 and the system catalog 160. For example, the persistent storage 142 may include hard drives, solid state drives, or other forms of persistent data storage. The persistent storage 142 may be distributed across any number of computing devices. The working storage 144 may be any suitable combination of hardware and software for storage of data which may be persistent or non-persistent and may be used to allow for records from the records 150 to be operated with outside of the persistent storage 142. For example, the working storage 144 may include hard drives, solid state drives, random access memory, or other forms of data storage which may be persistent or non-persistent.

The records 150 may include records for the databases of the various tenants of the database system 100. Records in the records 150 may include a tenant identifier to identify the owner of the records. The tenant identifier assigned to a tenant may be used as part of the key for all of the records belonging to the tenant that may be stored in the database.

The value of a tenant identifier may be represented as, for example, an alphanumeric string. A unique tenant identifier may be assigned to each of the tenants of the database system 100. Multi-tenancy may allow various tenants, which may be, for example, users, groups of users, or organizations, to access their own records in the database system 100 through software tools or instances on the database system 100 that may be shared among the various tenants. The record set for each tenant, including records stored in the records 150, may be, for example, a relational database, hierarchical database, or any other suitable database type. The records 150 may be stored in the persistent storage 142 of the database system 100 in any suitable structure, including, for example, a Log-Structured Merge (LSM) tree. The records may be stored immutable, so that updates to a record after the record is created result in the creation of a new version of the record without making any changes to the stored previous version of the record.

A record from the records 150 stored in the database system 100 may include a key. The key may be an identifier for the record, for example, a primary key, and may be in any suitable form, such as, for example, an alphanumeric sequence. Portions of the key may provide information about the record. For example, a portion of the key be the tenant identifier for the tenant to whom the record belongs. Other portions of the key may identify, for example, a table number and identification of a row, for example, when the value of record is the contents of a row.

A record may include values. The values in a record may be, for example, the contents of columns in a row of a table of a relational database, stored as a tuple with one value per column. The values stored as a tuple may be encoded, for example, using a binary encoding. Some records may store an encoded value of the tenant identifier for the tenant that owns the record in the tuple. The encoded value of the tenant identifier may be stored in, for example, a tenant identifier column of the record. The encoded value of the tenant identifier may also be stored in other columns of the record which may not be tenant identifier columns.

The system catalog 160 may include metadata for tenant's record sets stored in the database system 100. For example, the system catalog 160 may include metadata describing properties of the various column types used in the records of the records 150 for a tenant's record set.

Figure 2A:
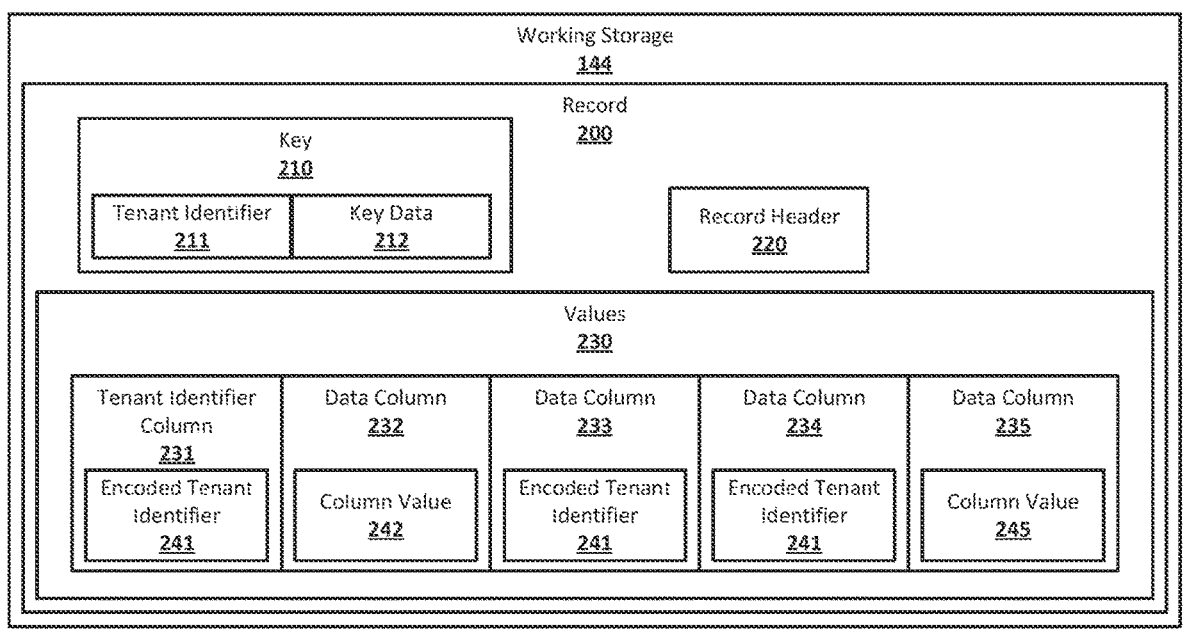
FIG. 2A shows an example arrangement for translation of tenant identifiers according to an implementation of the disclosed subject matter.

FIG. 2A shows an example arrangement for translation of tenant identifiers according to an implementation of the disclosed subject matter. A record 200 from the records 150 may copied into the working memory 144, for example, by the database executor 110 in response to a query to the database system 100. The database executor 110 may unpack the record 200, for example, expanding the tuple of the record 200 into columns. The record 200 may include a key 210, a record header 220, and values 230. The key 210 may be the key used to identify the record 200 in the tenant's record set and may include a tenant identifier 211 and key data 212. The tenant identifier 211 may be a value of the tenant identifier 211 for the tenant that owns the record 200. The key data 212 may be other data included in the key 210, such as, for example, a table number and identification of a row of the table for the record 200. The key 211 may be stored in the form of an alphanumeric string which may be a concatenation of the tenant identifier 211 and the key data 212.

The record header 220 may be a portion of the record 200 which may store metadata and other additional data for the record 200 that is outside of the values 230. For example, the record header 200 may include indicators, for example, as bits that can be set to 1, or true, or 0, or false, to indicate properties of the record 200.

The values 230 of the record 200 may include the values stored in the columns of the record 200. The values 230 may form a tuple. The columns of the record 200 may be based on the columns of the table of the tenant's record set to which the record 200 belongs, for example, as identified in the key data 212. For example, the columns may be a tenant identifier column 231 and data columns 232, 233, 234, and 235. The tenant identifier column 231 may be a column that stores an encoded tenant identifier 241, which may be an encoding of the value of the tenant identifier 211. The encoding may be, for example, a binary encoding. The data columns 232, 233, 234, and 235, may be columns that store various types of data for the record, such as, for example, character strings of set or varying lengths, or numbers. For example, the data column 232 may store a column value 242, which may be an encoding of a value, such as a character string or number. The data column 235 may store a column value 245, which may be an encoding of a value, such as a character string or number. In some records of the records 150 for a tenant, the encoded value of the tenant identifier may be stored in the columns of the record that are not the tenant identifier column. For example, the record 200 may store the encoded tenant identifier 231 in the data columns 233 and 234 in addition to the tenant identifier column 241.

Figure 2B:
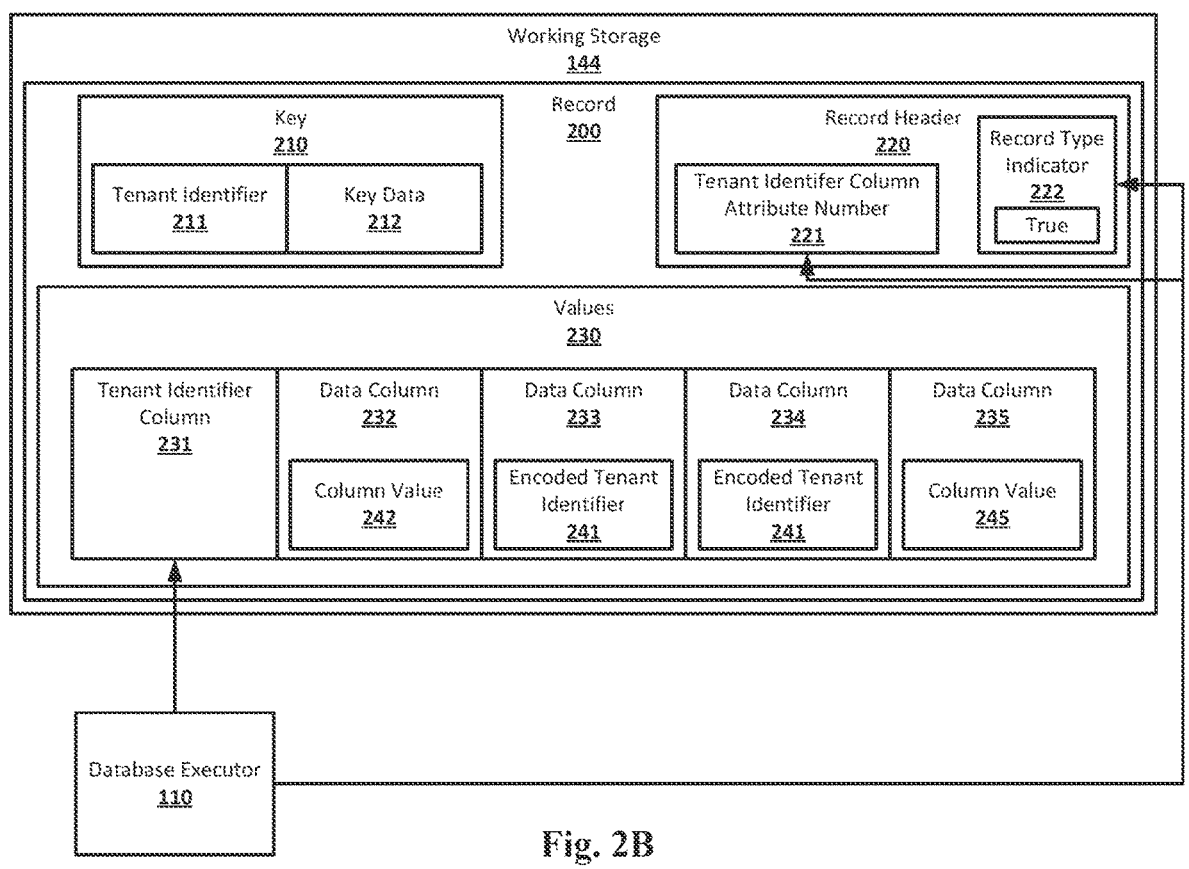
FIG. 2B shows an example arrangement for translation of tenant identifiers according to an implementation of the disclosed subject matter.

FIG. 2B shows an example arrangement for translation of tenant identifiers according to an implementation of the disclosed subject matter. The data executor 110 may convert a record, such as the record 200, that is in the working storage 144 into a format that may allow for more efficient translation of tenant identifiers before the record is packed and stored in the persistent storage 142. The database executor 110 may remove the encoded tenant identifier 241 from the tenant identifier column 231, so that the value stored by the tenant identifier column 231 may be an empty value. The database executor 110 may store a tenant identifier column attribute number 221 in the record header 220. The tenant identifier column attribute number 221 may be used to identify the tenant identifier column 231 in the values 230. The database executor 110 may set a record type indicator 222 to 1, or true. The record type indicator 222 may be an indicator, such as a bit, that may be used to indicate when the record 200 has had the encoded tenant identifier 241 removed from the tenant identifier column 231. If the record 200 did not include the encoded tenant identifier 241 in any of the other columns in the values 230, the database executor 110 would then pack in the record 200 for storage with the records 150 in the persistent storage 142.

Figure 2C:
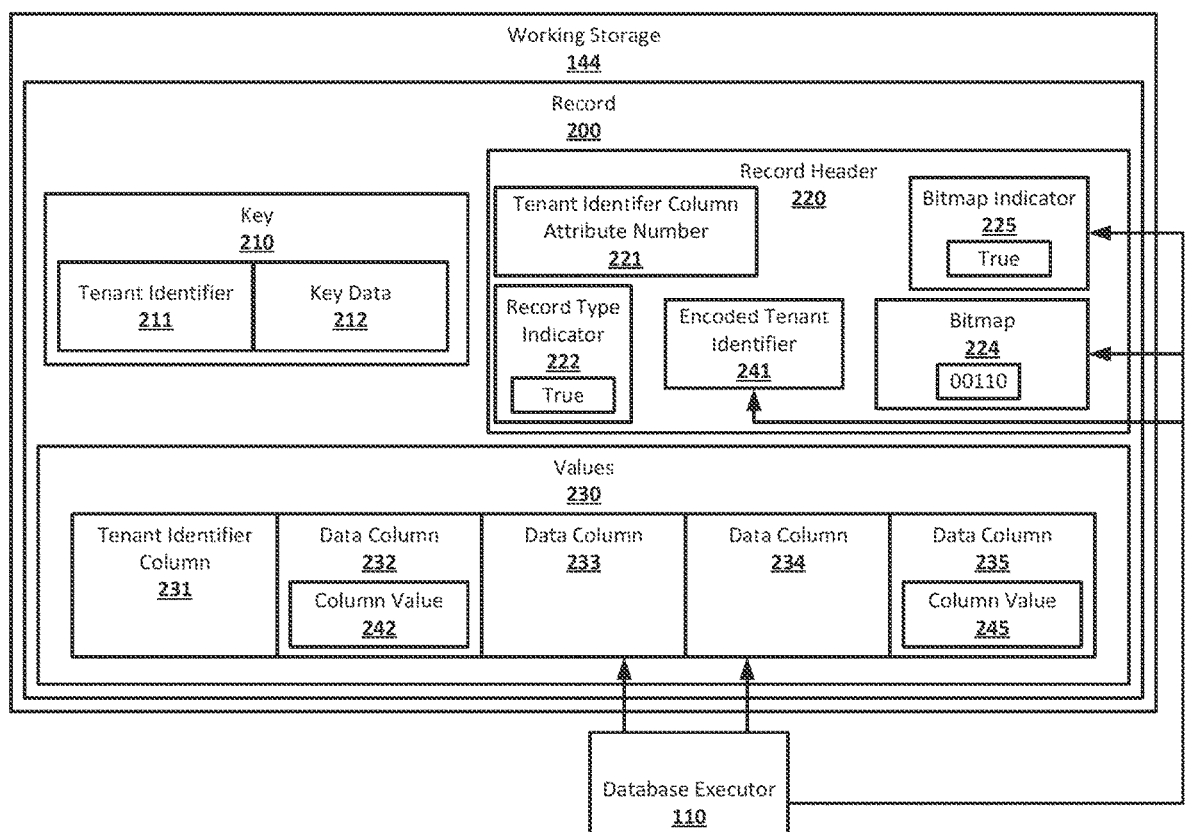
FIG. 2C shows an example arrangement for translation of tenant identifiers according to an implementation of the disclosed subject matter.

FIG. 2C shows an example arrangement for translation of tenant identifiers according to an implementation of the disclosed subject matter. The database executor 110 may examine the rest of the columns in the values 230 to determine if any of the columns store the encoded tenant identifier 241. The database executor 110 may find that the encoded tenant identifier 241 is stored in the data column 233 and the data column 234. The database executor 110 may remove the encoded tenant identifier 241 from the data column 233 and the data column 234, so that both columns may store an empty value. The database executor 110 may write the encoded tenant identifier 241 into the record header 220 of the record 200. The database executor may generate the bitmap 224.

The bitmap 224 may identify the columns in the value 230 of the record 200 outside the tenant identifier column 231 which had stored the encoded tenant identifier 241. For example, the bitmap 224 for the record 200 may be 00110, indicating that the third and fourth columns, the data column 233 and the data column 234, are the columns outside of the tenant identifier column 231 which had stored the encoded tenant identifier 241. The bitmap 224 may be written to the record header 220.

The database executor 110 may set a bitmap indicator 225 to 1, or true. The bitmap indicator 225 may be, for example, a bit which may indicate whether the record header 220 stores a bitmap, such as the bitmap 224, and an encoded value of the tenant identifier, such as the encoded tenant identifier 241.

Figure 3:
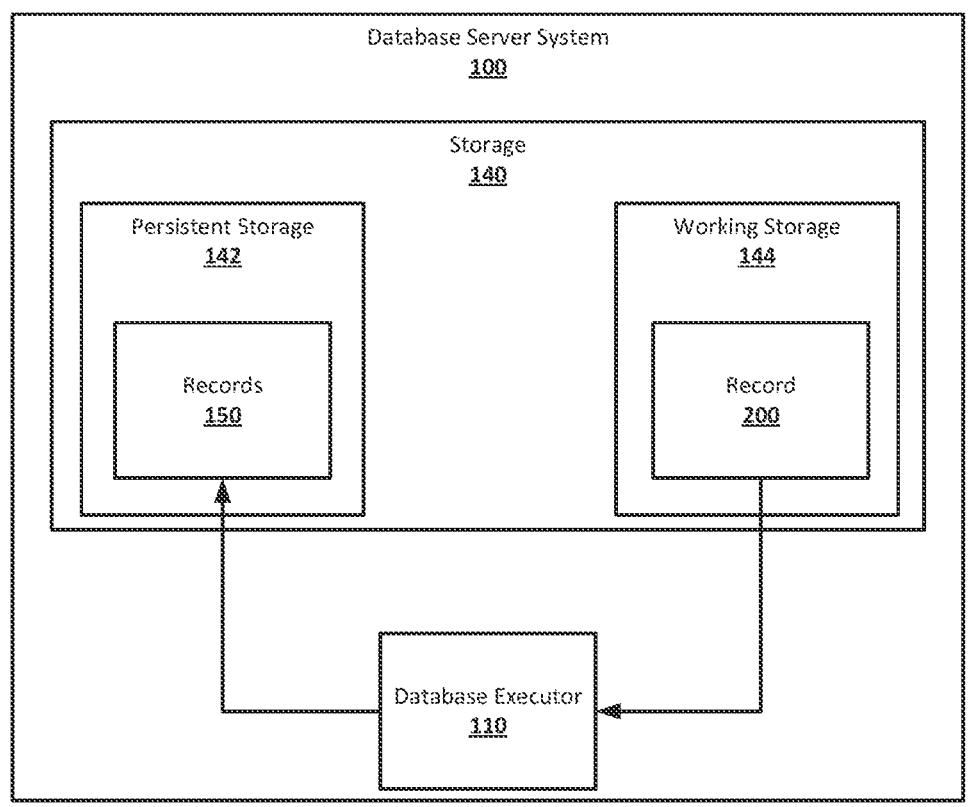
FIG. 3 shows an example arrangement for translation of tenant identifiers according to an implementation of the disclosed subject matter.

FIG. 3 shows an example arrangement for translation of tenant identifiers according to an implementation of the disclosed subject matter. The database executor 110, after changing the format of the record 200, may pack the record 200 and store it with the records 150 in the persistent storage 142 of the database system 100. The record 200 may be removed from the working storage 144.

Figure 4:
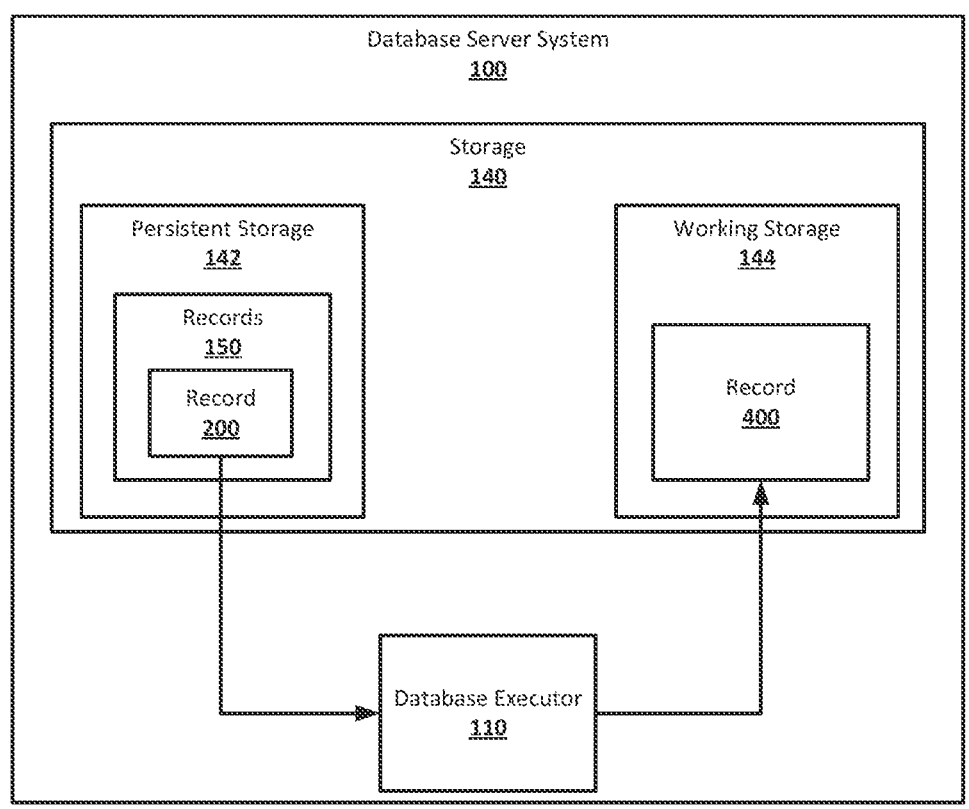
FIG. 4 shows an example arrangement for translation of tenant identifiers according to an implementation of the disclosed subject matter.

FIG. 4 shows an example arrangement for translation of tenant identifiers according to an implementation of the disclosed subject matter. A tenant's record set in the database system 100 may be cloned, for example, to create a sandbox database. The database executor 110 may copy records of the tenant's record set, from the records 150 in the persistent storage 142, to the working storage 144. For example, the database executor 110 may copy the record 200 into the working storage as the record 400. The packed data in the record 200, for example, the tuple including the values for the values 230, may be expanded when the record 200 is copied into the working storage as the record 400.

Figure 5A:
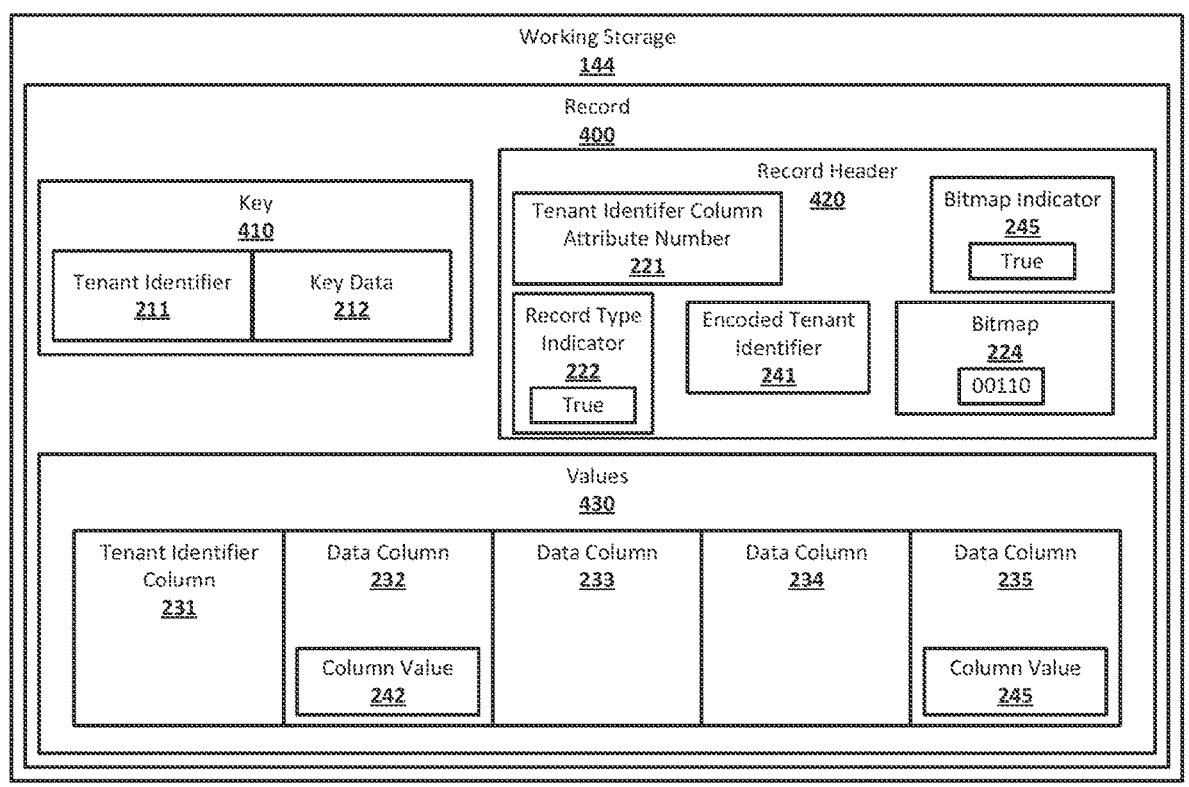
FIG. 5A shows an example arrangement for translation of tenant identifiers according to an implementation of the disclosed subject matter.

FIG. 5A shows an example arrangement for translation of tenant identifiers according to an implementation of the disclosed subject matter. The record 400 may be a copy of the record 200, and may include the key 410, the record header 420, and the values 430. The key 410 may be a copy of the key 210, including the tenant identifier 211 and the key data 212. The record header 420 may be a copy of the record header 220, include the tenant identifier attribute number 221, the record type indicator 222, the encoded tenant identifier 241, the bitmap 224, and the bitmap indicator 225. The values 430 may be a copy of the values 230, including the tenant identifier column 231 storing an empty value, the data column 232 storing the column value 242, the data column 233 storing an empty value, the data column 234 storing an empty value, and the data column 235 storing the column value 245.

Figure 5B:
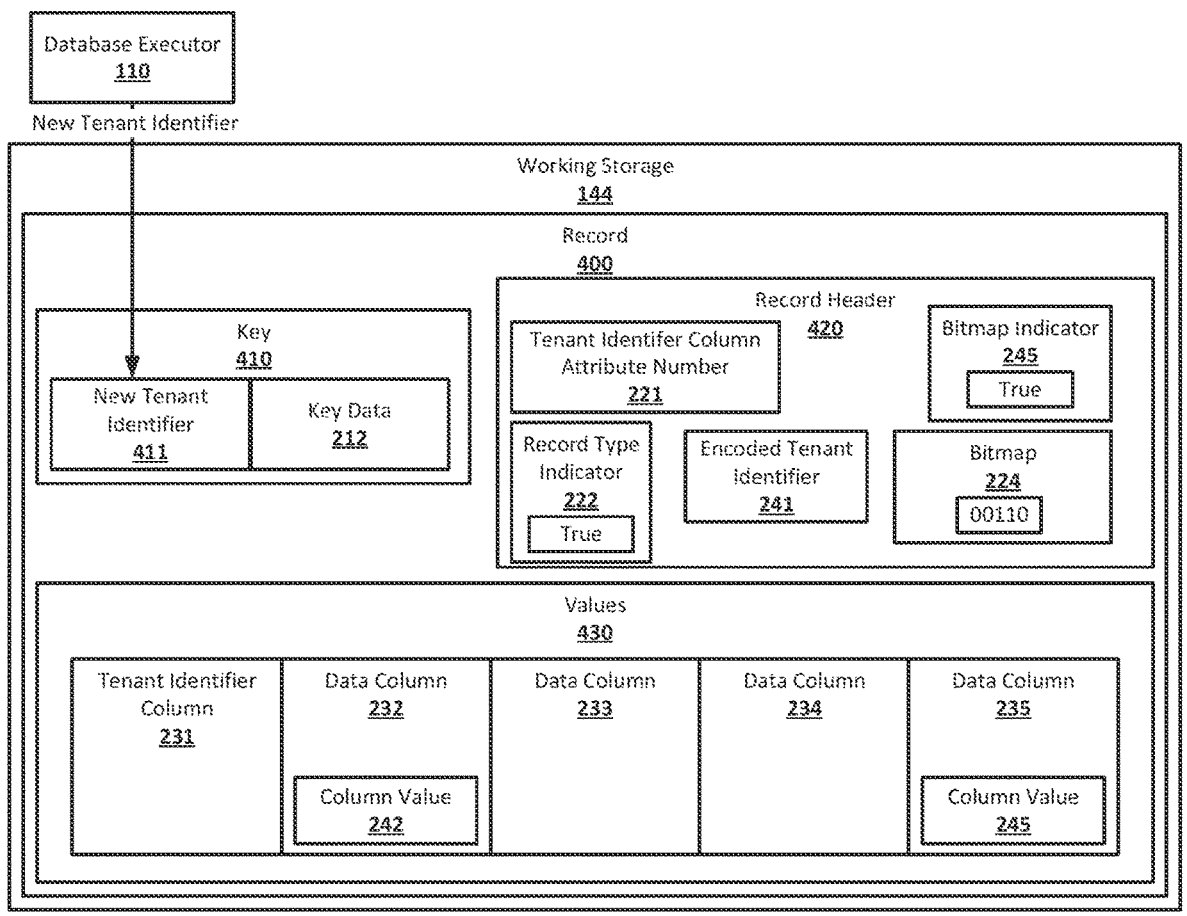
FIG. 5B shows an example arrangement suitable for translation of tenant identifiers according to an implementation of the disclosed subject matter.

FIG. 5B shows an example arrangement for translation of tenant identifiers according to an implementation of the disclosed subject matter. The database executor 110 may perform translation of the tenant identifier of the record 400 in order to prepare the record 400 for use in a sandbox database that is cloned from records from the tenant's record set that includes the record 200. Tenant identifier translation may be needed to prevent conflict between the records in the sandbox database and the records in the tenant's record set that was cloned to create the sandbox database.

The database executor 110 may determine the value of the tenant identifier for the tenant that owns the record 200, of which the record 400 is a copy, from the key 410, or from a scan descriptor in a query received by the database system 100 and to which the record 200 was responsive, for example, the scan descriptor used to locate records to clone to create a sandbox database. The database executor 110 may then use a new value for a tenant identifier, for example, new tenant identifier 411, to replace the value of the tenant identifier, for example, the tenant identifier 211, in the key 410. The new tenant identifier 411 may be a value for a tenant identifier that is different from the value for the tenant identifier 211, indicating that a new tenant owns the record 400. The new tenant represented by the new tenant identifier 411 may be the same entity, for example, same users, groups of users, or organization, as the tenant represented by the tenant identifier 211, or may be a different entity. For example, an entire organization may be represented by the tenant identifier 211, while only a subset of that organization may be represented by the tenant identifier 411. This may allow for control over the entities, including people and organizations, that have access to a sandbox database that is a clone of an existing tenant's record set, separating access to the sandbox database and tenant's record set.

The database executor 110 may check the bitmap indicator 225. If the bitmap indicator 225 were set to 0, or false, then the database executor 110 may be finished with the translation of the tenant identifier for the record 400. The database executor 110 may then encode the new tenant identifier 411 and store the encoding in the tenant identifier column 231, identified using the tenant identifier column attribute number 221, and make the record 400 available as part of the sandbox database.

Figure 5C:
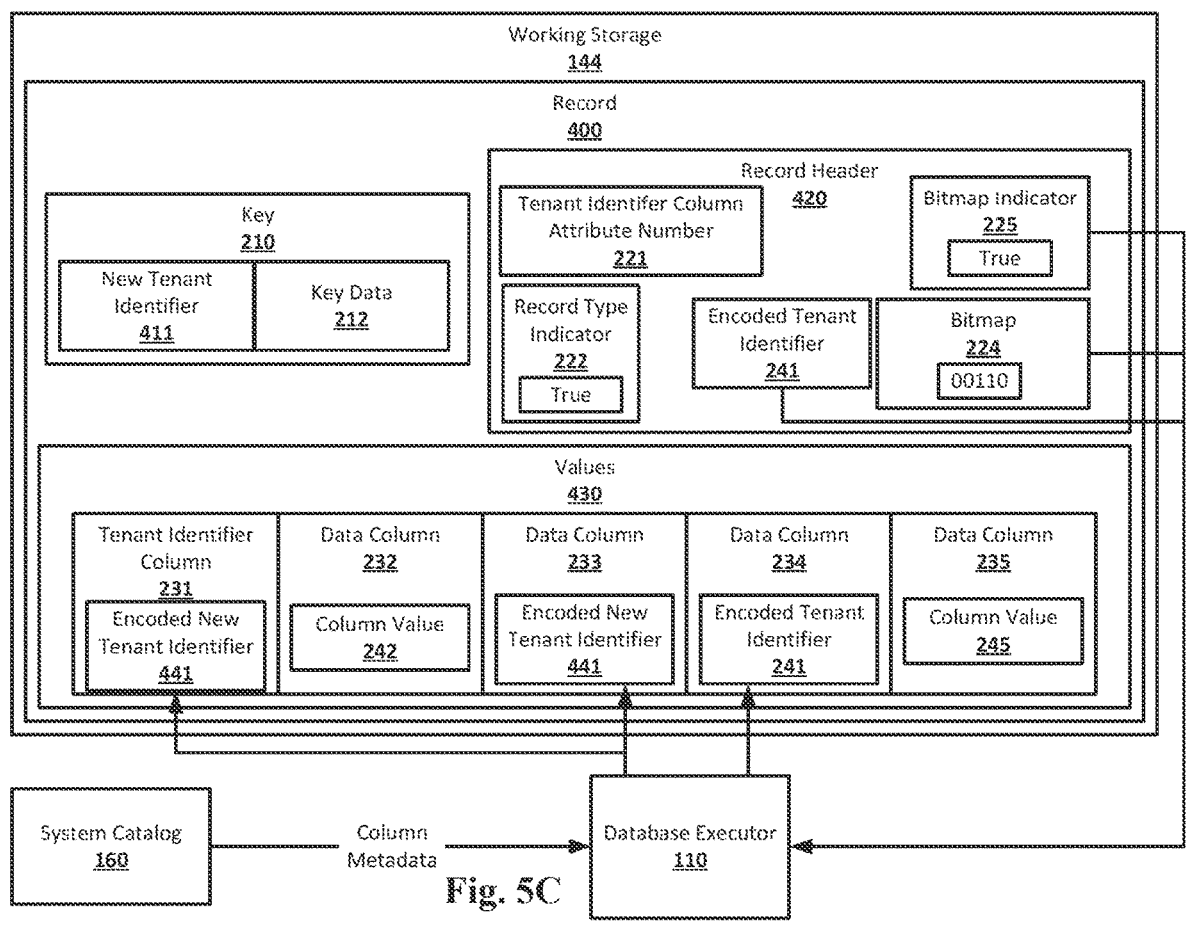
FIG. 5C shows an example arrangement suitable for translation of tenant identifiers according to an implementation of the disclosed subject matter.

FIG. 5C shows an example arrangement for translation of tenant identifiers according to an implementation of the disclosed subject matter. The database executor 110 may check the bitmap indicator 225 in the record header 420. The bitmap indicator 225 may be set to 1, or true, indicating that the record header 420 stores both a bitmap and an encoded tenant identifier.

The database executor 110 may check the bitmap 224, which may be, for example, 00110, to determine which columns in the values 430 had previously stored the encoded tenant identifier 241. The database executor 110 may determine that the data columns 233 and 234 previously stored the encoded tenant identifier 241. The database executor 110 may check column metadata from the system catalog 160 to determine whether tenant identifier translation is enabled or disabled for the column types of the data column 233 and 234. The column metadata may indicate that tenant identifier translation is enabled for the column type of the data column 233 but is disabled for the column type of the data column 234. The database executor 110 may store an encoded new value of the tenant identifier, the new identifier 411, in the data column 233 as the encoded new tenant identifier 441.

The database executor may copy the encoded tenant identifier 241 from the record header 420 and write the encoded tenant identifier 241 to the data column 234. The database executor may also write the encoded new tenant identifier 441 to the tenant identifier column 231, which may be identified using the tenant identifier column attribute number 221. This may complete the portions of the translation of tenant identifiers for the record 400 that can be performed on the database system 100 without resulting in database corruption. The record 400 may be made available for access by, for example, a database application which may be used to interact with the database system 400.

Figure 5D:
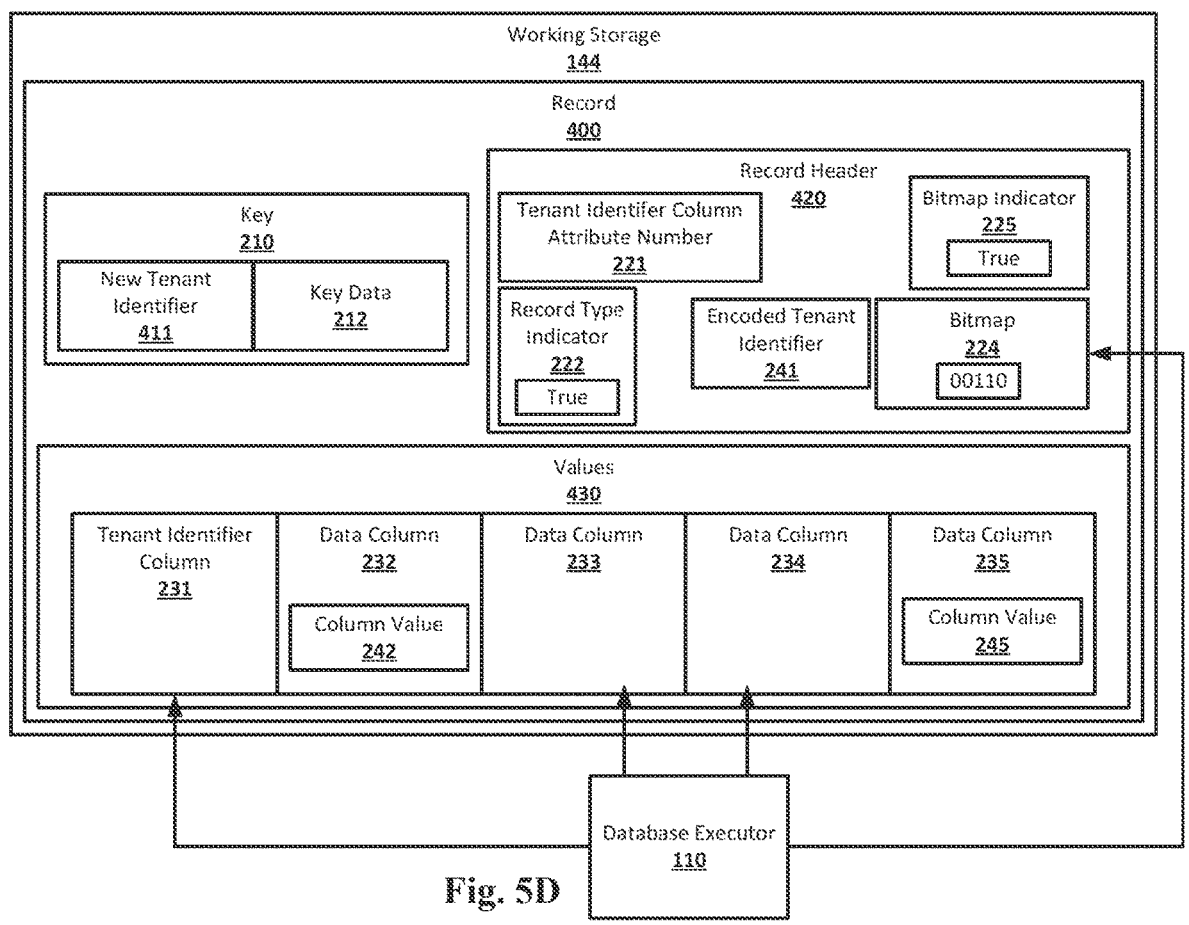
FIG. 5D shows an example arrangement suitable for translation of tenant identifiers according to an implementation of the disclosed subject matter.

FIG. 5D shows an example arrangement for translation of tenant identifiers according to an implementation of the disclosed subject matter. The database executor 110 may prepare the record 400 for packing and storage in the persistent storage 142 with the records 150 by removing the encoded new tenant identifier 441 from the tenant identifier column 231 and the data column 233 and removing the encoded tenant identifier 241 from the data column 234. The database executor 110 may also re-generate the bitmap 224.

For example, the bitmap 224 may be regenerated based on the occurrence of copies of the encoded new tenant identifier 441 in the columns of the record 400 outside of the tenant identifier column 231.

Figure 6:
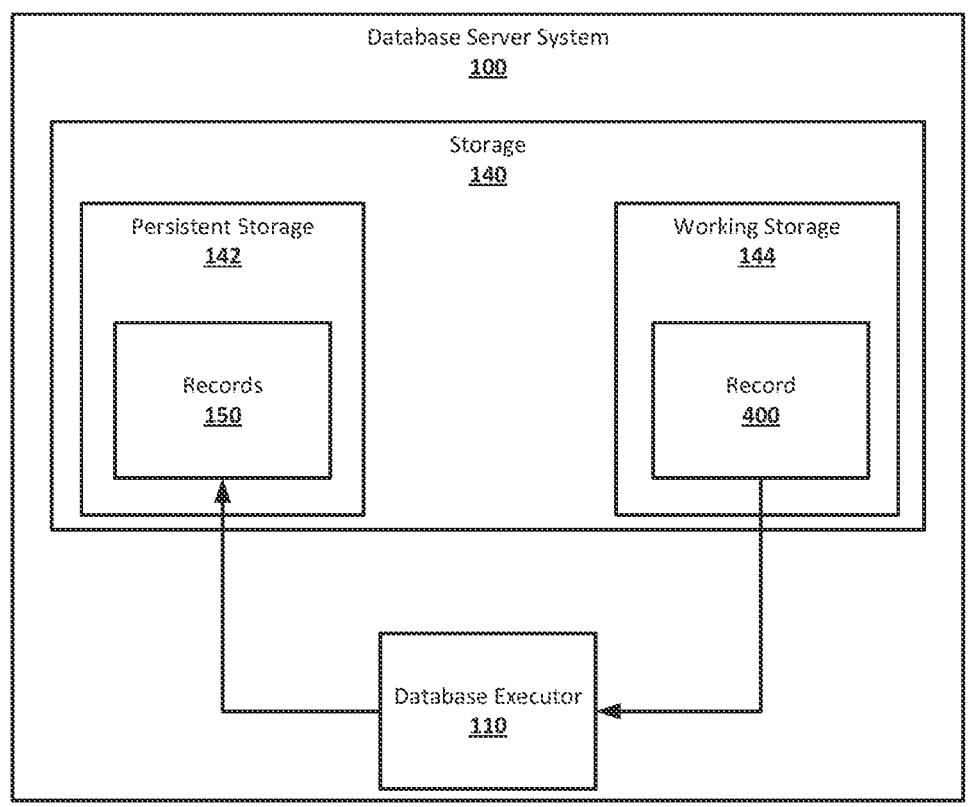
FIG. 6 shows an example arrangement suitable for translation of tenant identifiers according to an implementation of the disclosed subject matter.

FIG. 6 shows an example arrangement for translation of tenant identifiers according to an implementation of the disclosed subject matter. The database executor 110, after completing the translation of the tenant identifier for the record 400, may pack the record 400 and store it with the records 150 in the persistent storage 142 of the database system 100. The record 400 may be removed from the working storage 144.

Figure 7:
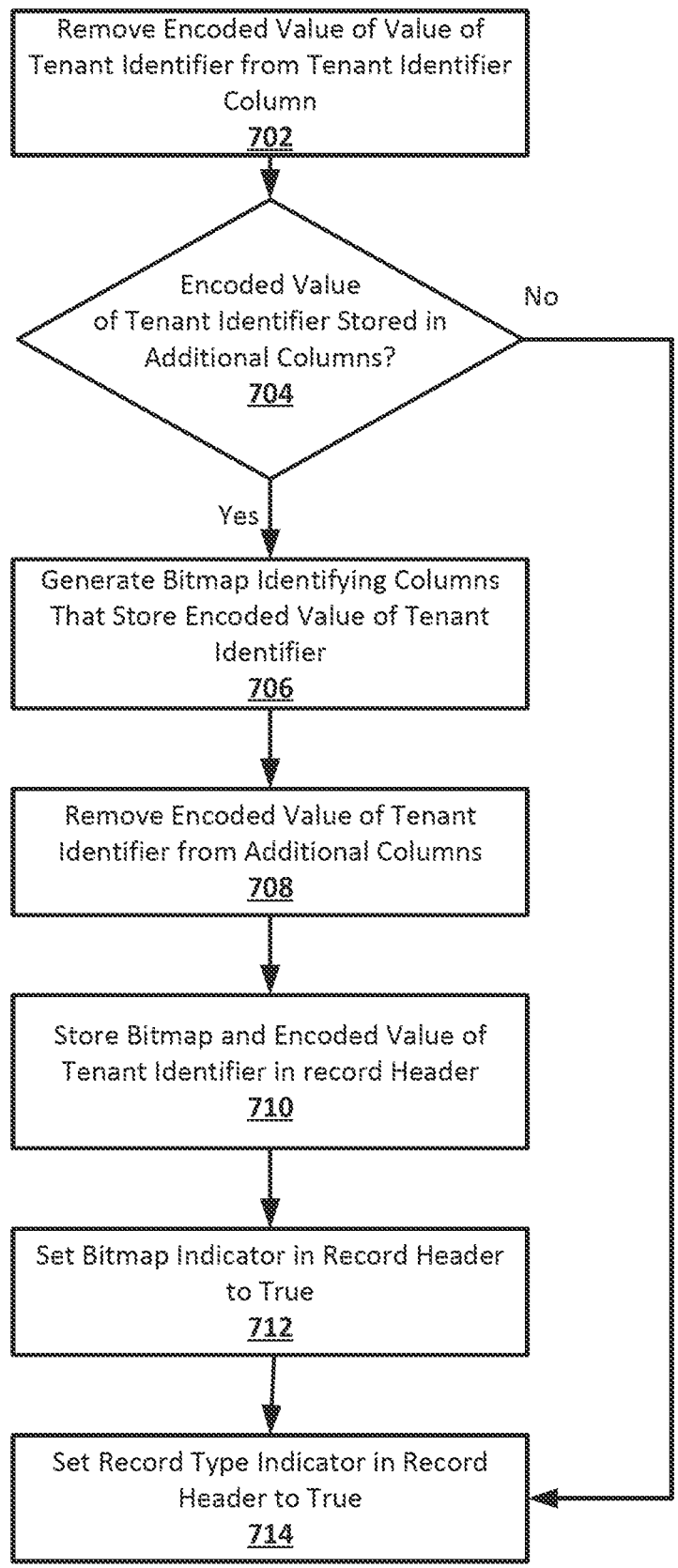
FIG. 7 shows an example procedure suitable for translation of tenant identifiers according to an implementation of the disclosed subject matter.

FIG. 7 shows an example procedure suitable for translation of tenant identifiers according to an implementation of the disclosed subject matter. At 702, an encoded value of a tenant identifier may be removed from a tenant identifier column of a record. For example, the data executor 110 may copy the record 200 from the persistent storage 142 to the working storage 144 and may remove the encoded tenant identifier 241 from the tenant identifier column 231.

At 704, if the encoded value of the tenant identifier is stored in any additional columns of the record, flow may proceed to 706. Otherwise, flow may proceed to 714 where the record type indicator for the record may be set. For example, the database executor 110 may check the columns of the values 230 of the record 200 to determine if any still store the encoded tenant identifier 241.

At 706, a bitmap identifying columns that store the encoded value of the tenant identifier may be generated. For example, the database executor 110 may generate the bitmap 224 which may identify the data columns 233 and 234 of the record 200 as storing the encoded tenant identifier 241.

At 708, the encoded value of the tenant identifier may be removed from any additional columns in which it is stored. For example, the database executor 110 may remove the encoded tenant identifier 241 from the data columns 233 and 234 of the record 200.

At 710, the bitmap and the encoded value of the tenant identifier may be stored in the record header. For example, the database executor 110 may write the bitmap 224 and the encoded tenant identifier 241 to the record header 220 of the record 200.

At 712, a bitmap indicator in the record header may be set to true. For example, the database executor 110 may set the bitmap indicator 225 in the record header 220 to 1, or true, to indicate that the bitmap 224 and the encoded tenant identifier 241 are both stored in the record header 220 of the record 200.

At 714, a record type indicator in the record header may set to true. For example, the database executor 110 may set the record type indicator 222 to 1, or true, to indicate that the record 200 has had the encoded tenant identifier 241 removed from all columns it was stored in among the values 230 of the record 200.

Figure 8:
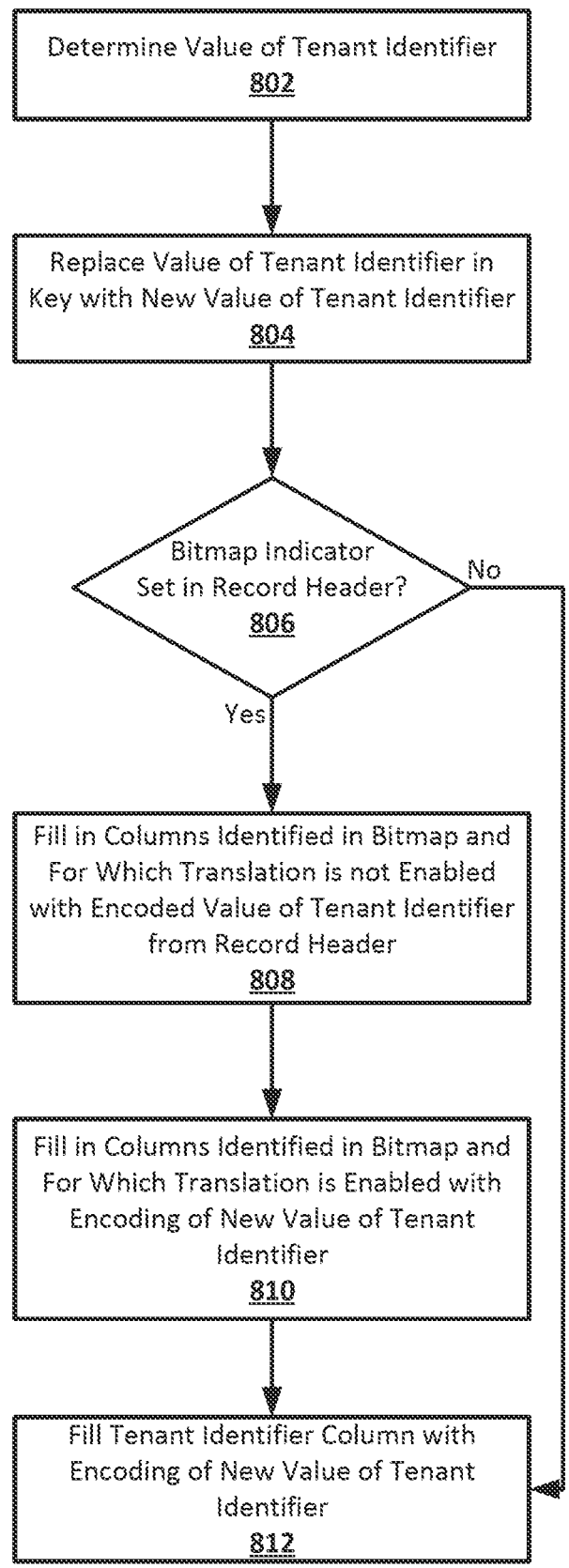
FIG. 8 shows an example procedure suitable for translation of tenant identifiers according to an implementation of the disclosed subject matter.

FIG. 8 shows an example procedure suitable for translation of tenant identifiers according to an implementation of the disclosed subject matter. At 802, a value of a tenant identifier may be determined. For example, the database executor 110 may have copied the record 200 into the working storage 144 as the record 400 as part of a cloning of a tenant's record set to create a sandbox database. The database executor 110 may perform translation of the tenant identifier of the record 400 to prepare it for use in the sandbox database. The database executor 110 may determine the tenant identifier 211 by, for example, reading the tenant identifier 211 from the key 410, or retrieving the tenant identifier 211 from a scan descriptor used in a query to which the record 200 was responsive.

At 804, the value of the tenant identifier may be placed in the key with a new value of a tenant identifier. For example, the database executor 110 may replace the tenant identifier 211 in the key 410 with the new tenant identifier 411. The new tenant identifier 411 may be a new value for a new tenant identifier that will be used for a sandbox database that may include the record 400 as a copy of the record 200.

At 806, if the bitmap indicator is set in the record header, flow may proceed to 808. Otherwise, flow may proceed to 808, where the tenant identifier column may be filled with the encoding of new value of the tenant identifier. For example, the database executor 110 may check the bitmap indicator 225 in the record header 430 to determine if the bitmap indicator 225 is set to true, or 1, or set to false, or 0.

At 808, columns identified in the bitmap and for which translation is not enabled may be filled in with the encoded value of the tenant identifier from the record header. For example, the database executor 110 may check the metadata for the data columns 233 and 234, which may be indicated by the bitmap 224 as having previously stored the encoded tenant identifier 241. The metadata may indicate that tenant identifier translation is not enabled for the data column 234. The database executor 110 may copy the encoded tenant identifier 241 from the record header 220 and write it to the data column 234.

At 810, columns identified in the bitmap and for which translation is enabled may be filled in with the encoded new value of the tenant identifier. For example, the database executor 110 may check the metadata for the data columns 233 and 234, which may be indicated by the bitmap 224 as having previously stored the encoded tenant identifier 241. The metadata may indicate that tenant identifier translation is enabled for the data column 233. The database executor 110 may encode the new tenant identifier 211, for example, from the key 410 or held in memory, and write the encoded new tenant identifier 241 to the data column 233.

At 812, the tenant identifier column may be filled with the new value of the tenant identifier. For example, the database executor 110 may write the encoded tenant identifier 241 to the tenant identifier column 231, which may be identified based on the tenant identifier column attribute number 221 in the record header 220.

Figure 9:
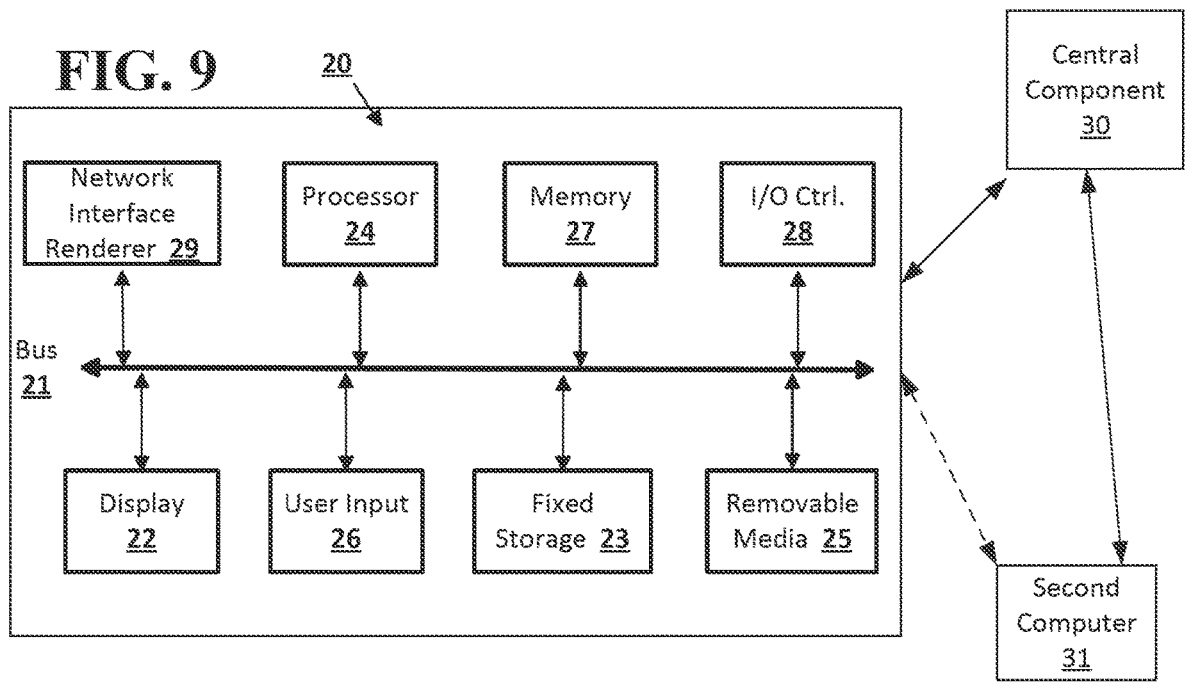
FIG. 9 shows a computer according to an implementation of the disclosed subject matter.

Implementations of the presently disclosed subject matter may be implemented in and used with a variety of component and network architectures. FIG. 9 is an example computer 20 suitable for implementing implementations of the presently disclosed subject matter. As discussed in further detail herein, the computer 20 may be a single computer in a network of multiple computers. As shown in FIG. 9, computer may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with computer 31. Alternatively or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touch-screen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, wide-area, or other networks, as shown in FIG. 10.

Many other devices or components (not shown) may be connected in a similar manner (e.g., document scanners, digital cameras and so on). Conversely, all of the components shown in FIG. 9 need not be present to practice the present disclosure. The components can be interconnected in different ways from that shown. The operation of a computer such as that shown in FIG. 9 is readily known in the art and is not discussed in detail in this application. Code to implement the present disclosure can be stored in computer-readable storage media such as one or more of the memory 27, fixed storage 23, removable media 25, or on a remote storage location.

Figure 10:
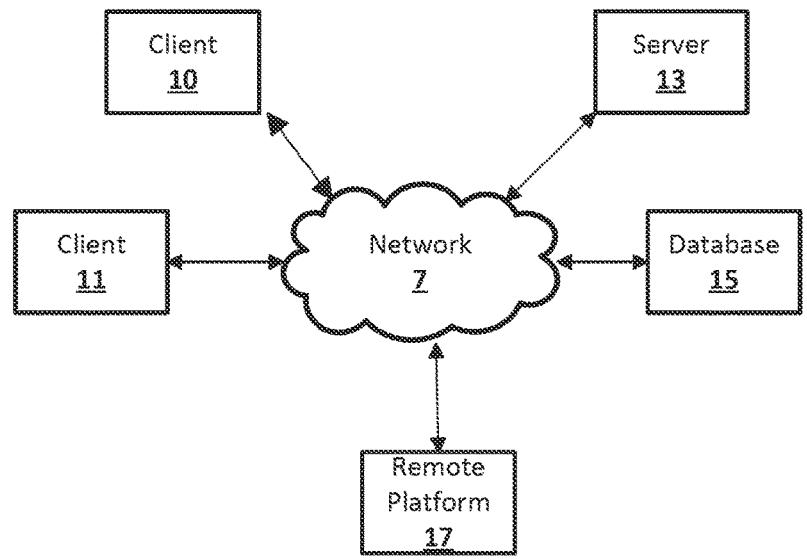
FIG. 10 shows a network configuration according to an implementation of the disclosed subject matter.

FIG. 10 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
receiving a record;
removing an encoded value of a tenant identifier from a tenant identifier column of the record stored with records of a database in a persistent storage of a database server at a working storage of the database server;

determining that the encoded value of the tenant identifier is stored in at least one other column of the record;

generating a bitmap identifying columns of the record where the encoded value of the tenant identifier is stored;

removing the encoded value of the tenant identifier from the columns of the record identified by the bitmap without removing the columns of the record identified by the bitmap;

storing the bitmap and the encoded value of the tenant identifier in a record header of the record;

storing the record with the records of the database in the persistent storage of the database server;

identifying, using the bitmap the columns of the record that stored the encoded value of the tenant identifier; and storing an encoded new value of the tenant identifier in the columns identified by the bitmap stored in the record header.

2. The computer-implemented method of claim 1, further comprising storing a bit in the record header of the record indicating that the bitmap and the encoded value of the tenant identifier are stored in the record header.

3. The computer-implemented method of claim 1, further comprising storing a bit in the record header of the record indicating that the encoded value of the tenant identifier was removed from the tenant identifier column of the record.

4. The computer-implemented method of claim 1, further comprising storing a tenant identifier column attribute number in the record header of the record that identifies the tenant identifier column.

5. The computer-implemented method of claim 1, wherein the record is received from the persistent storage of a multi-tenanted database system.

6. The computer-implemented method of claim 1, wherein the record is unpacked in working memory of a multi-tenanted database system.

7. A computer-implemented system for translation of tenant identifiers comprising:

one or more storage devices comprising a persistent storage and a working storage; and a processor that retrieves a record from the persistent storage and writes the record to the working storage, removes an encoded value of a tenant identifier from a tenant identifier column of the record, determines that the encoded value of the tenant identifier is stored in at least one other column of the record, generates a bitmap identifying columns of the record where the encoded value of the tenant identifier is stored, removes the encoded value of the tenant identifier from the columns of the record identified by the bitmap without removing the columns of the record identified by the bitmap, stores the bitmap and the encoded value of the tenant identifier in a record header of the record stores the record with the records of the database in the persistent storage of the database server, and identifies, using the bitmap the columns of the record that stored the encoded value of the tenant identifier, and stores an encoded new value of the tenant identifier in the columns identified by the bitmap stored in the record header.

8. The computer-implemented system of claim 7, wherein the processor further stores a bit in the record header of the record indicating that the bitmap and the encoded value of the tenant identifier are stored in the record header.

9. The computer-implemented system of claim 7, wherein the processor further stores a bit in the record header of the record indicating that the encoded value of the tenant identifier was removed from the tenant identifier column of the record.

10. The computer-implemented system of claim 7, wherein the processor further stores a tenant identifier column attribute number in the record header of the record that identifies the tenant identifier column.

11. The computer-implemented system of claim 7, wherein the record is received from the persistent storage of a multi-tenanted database system.

12. The computer-implemented system of claim 7, wherein the record is unpacked in working memory of a multi-tenanted database system.

13. A system comprising: one or more computers and one or more storage devices storing instructions which are operable, when executed by the one or more computers, to cause the one or more computers to perform operations comprising:

receiving a record;

removing an encoded value of a tenant identifier from a tenant identifier column of the record stored with records of a database in a persistent storage of a database server at a working storage of the database server;

determining that the encoded value of the tenant identifier is stored in at least one other column of the record;

generating a bitmap identifying columns of the record where the encoded value of the tenant identifier is stored;

removing the encoded value of the tenant identifier from the columns of the record identified by the bitmap without removing the columns of the record identified by the bitmap;

storing the bitmap and the encoded value of the tenant identifier in a record header of the record;

storing the record with the records of the database in the persistent storage of the database server;

identifying, using the bitmap the columns of the record that stored the encoded value of the tenant identifier; and storing an encoded new value of the tenant identifier in the columns identified by the bitmap stored in the record header.

14. The system of claim 13, wherein the instructions are operable, when executed by the one or more computers, to further cause the one or more computers to perform operations comprising storing a bit in the record header of the record indicating that the bitmap and the encoded value of the tenant identifier are stored in the record header.

15. The system of claim 13, wherein the instructions are operable, when executed by the one or more computers, to further cause the one or more computers to perform operations comprising storing a bit in the record header of the record indicating that the encoded value of the tenant identifier was removed from the tenant identifier column of the record.

16. The system of claim 13, wherein the instructions are operable, when executed by the one or more computers, to further cause the one or more computers to perform operations comprising storing a tenant identifier column attribute number in the record header of the record that identifies the tenant identifier column.

17. The system of claim 13, wherein the record is received from the persistent storage of a multi-tenanted database system.

18. The system of claim 13, wherein the record is unpacked in working memory of a multi-tenanted database system.

\* \* \* \* \*